(12) United States Patent
Tondolo et al.

(10) Patent No.: US 9,250,632 B2
(45) Date of Patent: *Feb. 2, 2016

(54) VALVE POSITIONING SYSTEM WITH BLEED PREVENTION

(71) Applicant: STI srl, Gorle-Bergamo (IT)

(72) Inventors: Flavio Tondolo, Stezzano BG (IT);
Roberto Valoti, Seriate BG (IT)

(73) Assignee: STI srl (IT)

( * ) Notice: Subject to any disclaimer, the term of this patent is extended or adjusted under 35 U.S.C. 154(b) by 271 days.

This patent is subject to a terminal disclaimer.

(21) Appl. No.: 13/728,477

(22) Filed: Dec. 27, 2012

(65) Prior Publication Data

US 2013/0174915 A1 Jul. 11, 2013

Related U.S. Application Data

(60) Provisional application No. 61/581,833, filed on Dec. 30, 2011.

(51) Int. Cl.
*F15B 19/00* (2006.01)
*G05D 7/06* (2006.01)
(Continued)

(52) U.S. Cl.
CPC .............. *G05D 7/0617* (2013.01); *F15B 5/006* (2013.01); *F15B 19/005* (2013.01); *F15B 20/008* (2013.01); *F15B 2211/3057* (2013.01); *F15B 2211/329* (2013.01); *F15B 2211/6303* (2013.01); *F15B 2211/6336* (2013.01); *F15B 2211/6355* (2013.01); *F15B 2211/7052* (2013.01); *F15B 2211/7053* (2013.01); *F15B 2211/87* (2013.01);
(Continued)

(58) Field of Classification Search
CPC .............. F15B 13/0431; F15B 13/0433; F15B 19/005; F15B 2211/3057; F15B 2211/327; F15B 2211/329; F15B 2211/355; F15B 2211/6303; F15B 2211/6355; F15B 2211/8752; Y10T 137/87209; Y10T 137/87201; Y10T 137/7761; Y10T 137/2544; F16K 37/041; F16K 31/02
See application file for complete search history.

(56) References Cited

U.S. PATENT DOCUMENTS

| | | | | |
|---|---|---|---|---|
| 4,647,004 A | * | 3/1987 | Bihlmaier | 251/28 |
| 5,038,670 A | * | 8/1991 | Roe | 91/455 |
| 5,934,169 A | * | 8/1999 | Regel | 91/361 |

(Continued)

FOREIGN PATENT DOCUMENTS

EP 0822344 A2 2/1998

OTHER PUBLICATIONS

Yeaple et al.: "Fluid Power Design Handbook." Oct. 24, 1995, XP002136333 (1 page).

(Continued)

*Primary Examiner* — Matthew W Jellett
(74) *Attorney, Agent, or Firm* — Stetina Brunda Garred & Brucker

(57) ABSTRACT

A valve positioner system with zero bleed at steady state is disclosed. The system has a pilot valve, the operation of which is controlled by an electronic circuit powered from a signaling and power connection of a positioner device. A plurality of pneumatic valves are activated and deactivated by the pilot valve to control a valve actuator. With varying configurations and arrangements of normally open or normally closed pilot valves and pneumatic valves, fail freeze and fail safe operations are contemplated. The activation and deactivation of the pilot valve is controlled by an electronic circuit that monitors a valve position signal.

21 Claims, 9 Drawing Sheets

(51) Int. Cl.
  *F15B 20/00* (2006.01)
  *F15B 5/00* (2006.01)
(52) U.S. Cl.
  CPC .... *F15B 2211/8752* (2013.01); *Y10T 137/0324* (2015.04); *Y10T 137/7761* (2015.04)

(56) References Cited

U.S. PATENT DOCUMENTS

| | | | |
|---|---|---|---|
| 6,131,609 A * | 10/2000 | Metso et al. | 137/552 |
| 6,655,404 B2 * | 12/2003 | Hilaire | 137/86 |
| 8,517,335 B2 * | 8/2013 | Tondolo et al. | 251/129.04 |
| 8,910,660 B2 * | 12/2014 | Schmidt et al. | 137/596.16 |
| 2001/0035512 A1 * | 11/2001 | Messer et al. | 251/129.04 |
| 2011/0284083 A1 | 11/2011 | Tondolo et al. | |

OTHER PUBLICATIONS

International Search Report and Written Opinion for PCT/IB2013/000004. Issued Apr. 29, 2013.

* cited by examiner

VALVE POSITIONING SYSTEM WITH BLEED PREVENTION

CROSS-REFERENCE TO RELATED APPLICATIONS

The present application claims priority to U.S. Provisional Patent Application Ser. No. 61/581,833 entitled VALVE POSITIONING SYSTEM WITH BLEED PREVENTION filed Dec. 30, 2011.

STATEMENT RE: FEDERALLY SPONSORED RESEARCH/DEVELOPMENT

Not Applicable

BACKGROUND OF THE INVENTION

1. Field of the Invention

The present invention relates generally to control systems for industrial processes, and more particularly, to pneumatic valve positioning systems and electrical circuits thereof with steady state gas bleed prevention.

2. Description of the Related Art

Many industrial processes involve the movement of fluid such as gas, steam, water, and chemical compounds. The flow of the fluid is regulated by a control valve that has a passageway that is selectively opened and closed with a movable obstruction or valve element connected to a stem. An actuator, in turn, is connected to the stem, and provides the motive force to open and close the valve element. Pneumatic, hydraulic, electrical, or mechanical energy is converted by the actuator to linear or rotational motion, depending on the configuration of the control valve.

A conventional pneumatic actuator is comprised of a piston sealed within a cylinder, and the piston includes a connecting rod that is mechanically coupled to the valve element. Compressed gas is forced into and out of the cylinder to move the connecting rod, which is mechanically coupled to the stem of the control valve. In a single-acting actuator, the compressed gas is taken in and exhausted from one end of the cylinder and is opposed by a range spring, while in a double-acting actuator, air is taken in one end of the cylinder while simultaneously exhausting it out of the opposing end.

Precise and accurate control of the valve actuator, and hence the valve element, can be achieved with a positioner device coupled thereto. Pneumatic valve positioners, which can cooperate with aforementioned pneumatic actuators, are well known in the art. The proportional movement of the actuator is accomplished by the movement of compressed gas into and out of the actuator piston. More particularly, valve positioners incorporate a spool (or other devices) that either rotates or slides axially in a housing to port the flow of compressed gas to the actuator or to one or more exhaust ports.

An electrical control circuit provides a variable current signal to the positioner device that proportionally corresponds to particular states of the actuator and hence a particular position of the control valve. The electrical control circuit and the electrical current signals generated thereby may be part of a broader process managed by a distributed control system (DCS). Generally, the electrical current varies between 4 milliamps (mA) and 20 mA according to industry-wide standards; at 4 mA the valve positioner may fully open the valve element, while at 20 mA the valve positioner may fully close the valve element. The positioner compares the received electrical signal to the current position of the actuator, and if there is a difference, the actuator is moved accordingly until the correct position is reached.

One previous solution involves an external component that monitors the variable current signal for the electrical control circuit and the actual position of the valve element, and responds by driving a lower power solenoid valve coupled to the valve actuator. These additional external components tend to be costly, and require a safe external power source with associated connectivity components. Along these lines, additional wiring and a separate junction box is required. In general, there are additional complications and costs, particularly for deployment in hazardous environments.

Another previous solution utilizes a valve positioner having normally closed on/off valves. However, the flow coefficient (Cv) of such valves is low, and oftentimes necessitate boosters for meeting stroking time requirements of most typical deployments. Furthermore, such boosters are also understood to exhibit some degree of leakage, largely negating the advantages of normally closed valves. In any case, the position of the valve actuator must be restored.

Accordingly, there is a need in the art for an improved valve positioner having zero bleed in a steady state position, and having such capability regardless of the flow coefficient of the positioner. It would be desirable for the valve positioner to be powered by the electrical current signal loop and not an external source, and therefore intrinsically safe.

BRIEF SUMMARY OF THE INVENTION

In accordance with one embodiment of the present invention, a valve positioner system with zero bleed at steady state is contemplated. There is a very low power pilot valve, the operation of which is controlled by an electronic circuit that is powered from a signaling and power connection of a positioner device. The circuit may monitor a valve position signal from the signaling and power connection in order to make control decisions to activate and deactivate the pilot valve. The valve positioner system may also include a plurality of pneumatic valves that are actuated in turn by the pilot valve. With varying configurations of normally open or normally closed pilot valves and pneumatic valves, fail freeze and fail safe operations may be possible while having zero bleed in steady state conditions. The present invention will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION OF THE INVENTION

The detailed description set forth below in connection with the appended drawings is intended as a description of certain embodiments of an electro-pneumatic valve positioner having steady-state zero bleed capabilities and is not intended to represent the only forms that may be developed or utilized. The description sets forth the various functions in connection with the illustrated embodiments, but it is to be understood, however, that the same or equivalent functions may be accomplished by different embodiments that are also intended to be encompassed within the scope of the present disclosure. It is further understood that the use of relational terms such as first and second, and the like are used solely to distinguish one entity from another without necessarily requiring or implying any actual such relationship or order between such entities.

Figure 1:
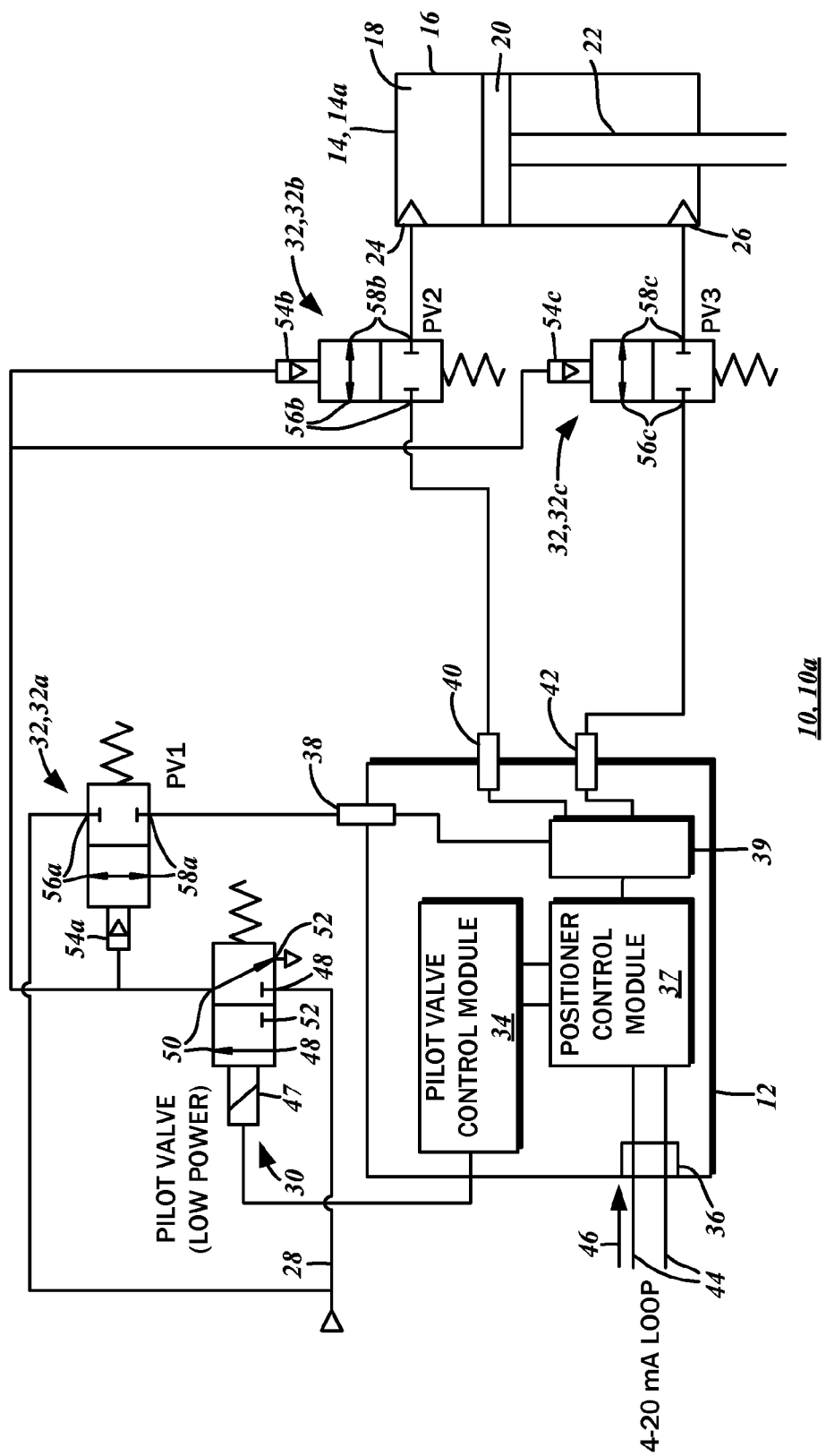
FIG. 1 is a block diagram illustrating the various components of a valve positioning apparatus in accordance with a first embodiment of the present disclosure including a normally closed pilot valve and normally closed on/off pneumatic valves operating with a double-acting actuator and configured for fail freeze operation.

With reference to the block diagram of FIG. 1, a first embodiment of the valve positioner system 10a with steady-state zero bleed includes a positioner device 12 that controls a valve actuator 14. The valve actuator 14, in turn, is linked to and modifies the position of a control valve (not shown) that regulates a part of a fluid flow process. In further detail, the valve actuator 14 includes a cylinder body 16 defining an interior chamber 18. A piston 20 reciprocates within the cylinder body 16 as gas is supplied and/or exhausted therefrom. The piston 20 is attached or otherwise mechanically coupled to a connecting rod 22, which is linked to the control valve. The foregoing description of the valve actuator 14 is presented by way of example only, and any other type of actuator, such as a rotary type or a diaphragm type may be substituted without departing from the scope of the present disclosure.

In the first embodiment of the valve positioner system 10 shown in FIG. 1, the valve actuator 14 is of a double-acting type (14a) including a first fluid flow passageway 24 and a second fluid flow passageway 26. Moving the piston 20 and the connecting rod 22 to its maximum extended state is achieved by supplying gas through the first fluid flow passageway 24, while simultaneously exhausting air through the second fluid flow passageway 26. On the other hand, moving the piston 20 and the connecting rod 22 to its maximum retracted state is achieved by exhausting gas through the first fluid flow passageway 24, while simultaneously supplying gas to the second fluid flow passageway 26. Other embodiments of the valve positioner system 10 may include a single-acting type valve actuator 14b, the details of which will be described further below in relation to those embodiments that utilize such type of a valve actuator.

The components of the valve positioner 10 are variously described herein as being driven by compressed air, but it will be recognized that any other inert gases may be utilized. Along these lines, other power systems such as hydraulics may be substituted, though pneumatics offer several advantages with respect to safety while operating in hazardous environments. Those having ordinary skill in the art will appreciate the modifications to the other components of the valve positioner system 10 described herein that are attendant to the use of such alternative power systems.

The supplying and exhausting of the compressed gas to and from the valve actuator 14 is governed by the positioner device 12, which may also be referred to as a valve positioner controller or a servomechanism. Again, the porting of gas to the valve actuator 14 is understood to provide a motive force thereto such that the position of the control valve can be adjusted. The ultimate source of such compressed gas is a pressure line 28, and depending on the various states of a pilot valve 30 and on/off two-way pneumatic valves 32, the compressed gas is selectively ported to the first fluid flow passageway 24 and the second fluid flow passageway 26. The state of the pilot valve 30 (and by logical extension, pneumatic valves 32) is set by a pilot valve control module 34 that executes control logic methods in accordance with several embodiments of the present disclosure.

In its basic configuration, the positioner device 12 may include an electrical input port 36, a pressure line intake port 38, a first output port 40, and a second output port 42. Generally, the signal received on the electrical input port 36 and the actuator actual position defines the degree to which the compressed gas from the pressure line intake port 38 is directed or exhausted to the first output port 40 and the second output port 42. The electrical input port 36 is connectable to a two-wire connection 44 delivering an analog electrical current ranging between 4 mA and 20 mA in the form of a valve position signal 46. The two-wire connection 44 is linked to a central regulator station that transmits the valve position signal 46 to the positioner device 12, among possibly other positioner devices. Although the basic operation of the valve positioner system 10 does not require it, the valve position signal 46 can carry a digital signal utilized by the positioner device 12 for additional functionality such as diagnostics, configuration, and so forth. The digital signal, as well as the related hardware interfaces, may be HART (Highway Addressable Remote Transducer) compliant. It is understood that the valve position signal 46 also provides electrical power to the positioner device 12 and other associated components.

The valve position signal 46 can be quantified as a percentage of the fully open or fully closed position of the valve actuator 14 and hence the control valve, and more specifically, as the pressure of the compressed gas that is ported from the pressure line 28 to the first and second output ports 40, 42 for achieving that position. For example, upon proper calibration, a 0% (4 mA) input signal may be defined as the fully closed position, while a 100% signal (20 mA) input signal may be defined as the fully open position. A 12 mA signal may represent a 50% position.

A separate positioner control module 37 may be independent of the pilot valve monitoring module may govern such functionality. In order to ensure the correct positioning of the valve actuator 14, a feedback sensor may be incorporated therein that reports to the controller module its actual position. The valve position signal 46 includes a set point or reference value, to which the value of the actual position signal is compared. The positioner control module 37, via an electro-pneumatic transducer 39, adjusts to supply more or less compressed gas to the valve actuator 14 to position the same to the designated set point. A variety of different methods may be used to effect a change in the flow rate of compressed gas to the valve actuator 14.

The positioner device 12 may be suitable for hazardous environments where flammable gasses in the environment have the potential to ignite from sparks typical in regular circuits and constituent components thereof. In this regard, the positioner device 12 may be intrinsically safe, in that, among other things, the electrical components and any others devices utilized therein operate on low voltages.

As shown in FIG. 1, the pressure line intake port 38 is not in direct fluid communication with the pressure line 28. Instead, the pilot valve 30 selectively connects the pressure line 28 to the pressure line intake port 38. Thus, the porting or directing of the compressed gas from the pressure line 28 to the first and second output ports 40, 42 is further proscribed by the control logic methods executed by the pilot valve control module 34.

The pilot valve 30 is understood to be a conventional normally closed three/two way valve with spring return. In this regard, there is an electrical pilot 47 that is connected to the pilot valve control module 34. Applying an electrical signal to the electrical pilot 47 switches from a normally closed or deactivated first position, to an open or activated second position. Power consumption is understood to be approximately 6 milliwatts (mW), and while having a very low fluid flow rate (CV), further work may be performed with its output. Such low power devices are known and may be intrinsically safe and suitable for use in hazardous environments. Such low power can be taken from the 4-20 mA loop to maintain the full operability of the positioner device 12.

In further detail, the pilot valve 30 has a pressure line intake port 48 coupled to the pressure line 28, a primary output port 50, and a secondary output port 52. In its normally closed or deactivated first position, the pressure line intake port 48 is not in fluid communication with either the primary output port 50 or the secondary output port 52. Instead, the primary output port 50 is in fluid communication with the secondary output port 52 that is being exhausted. In the activated, second position of the pilot valve 30, the pressure line intake port 48 is in fluid communication with the primary output port 50. In this state, the compressed gas from the pressure line 28 flows through and other work is performed therewith.

The primary output port 50 of the pilot valve 30 is coupled to a first on/off two-way pneumatic valve 32a, a second on/off two-way pneumatic valve 32b, and a third on/off two-way pneumatic valve 32c. In accordance with one embodiment of the present disclosure, the pneumatic valves 32 are understood to be standard 2/2 valves with pneumatic control. In this regard, each of the first, second, and third pneumatic valves 32 includes a corresponding pneumatic pilot 54a, 54b, and 54c, respectively. Compressed gas flowing from the pressure line 28 through the pilot valve 30 is ported to the pneumatic pilots 54. The pressure line 28 is in fluid communication with an input port 56a of the first pneumatic valve 32a. An output port 58a is in fluid communication with the pressure line intake port 38. Regarding this segment of the valve positioner system 10, with the pilot valve 30 being activated as a result of an electrical signal to the electrical pilot 47, the compressed gas from the pressure line 28 is ported through the first pneumatic valve 32a to the pressure line intake port 38, as the valve itself is activated in response to the activated first pneumatic pilot 54a thereof.

With the second pneumatic valve 32b, its input port 56b is in fluid communication with the first output port 40 of the positioner device 12, while its output port 58b is in fluid communication with the first fluid flow passageway 24 of the valve actuator 14. Similarly, with the third pneumatic valve 32c, its input port 56c is in fluid communication with the second output port 42 of the positioning device 12, while its output port 58c is in fluid communication with the second fluid flow passageway 26 of the valve actuator 14. As indicated above, the positioner device 12 may have a controller module 37 independent of the pilot valve monitoring control 34. The positioner device 12 ports or directs the compressed gas from the pressure line intake port 38 to the first output port 40 and the second output port 42 based proportionally upon the valve position signal 46 received on the electrical input port 36.

In accordance with various embodiments of the present disclosure, the pilot valve control module 34 is powered by the electrical current of the valve position signal 46. The pilot valve control module 34, being placed in series with the two-wire connection 44, also monitors the valve position signal 46 and utilizes it as input in making control decisions in which the pilot valve 30 and the pneumatic valve 32 are manipulated. The current draw of the pilot valve control module 34 is understood to be minimal and have little to no effect on the remainder of the positioner device 12, including the aforementioned separate controller module. Without the pilot valve control module 34, input voltage to the positioner device 12 is understood to be within the range of 12 V to 30 V. With a series addition of the pilot valve control module 34, the minimum input voltage increases while the current remains constant. The pilot valve control module 34 may be integrated into the positioner device 12, though various other embodiments contemplate the pilot valve module 34 being independent of the positioner control module 37.

Figure 2:
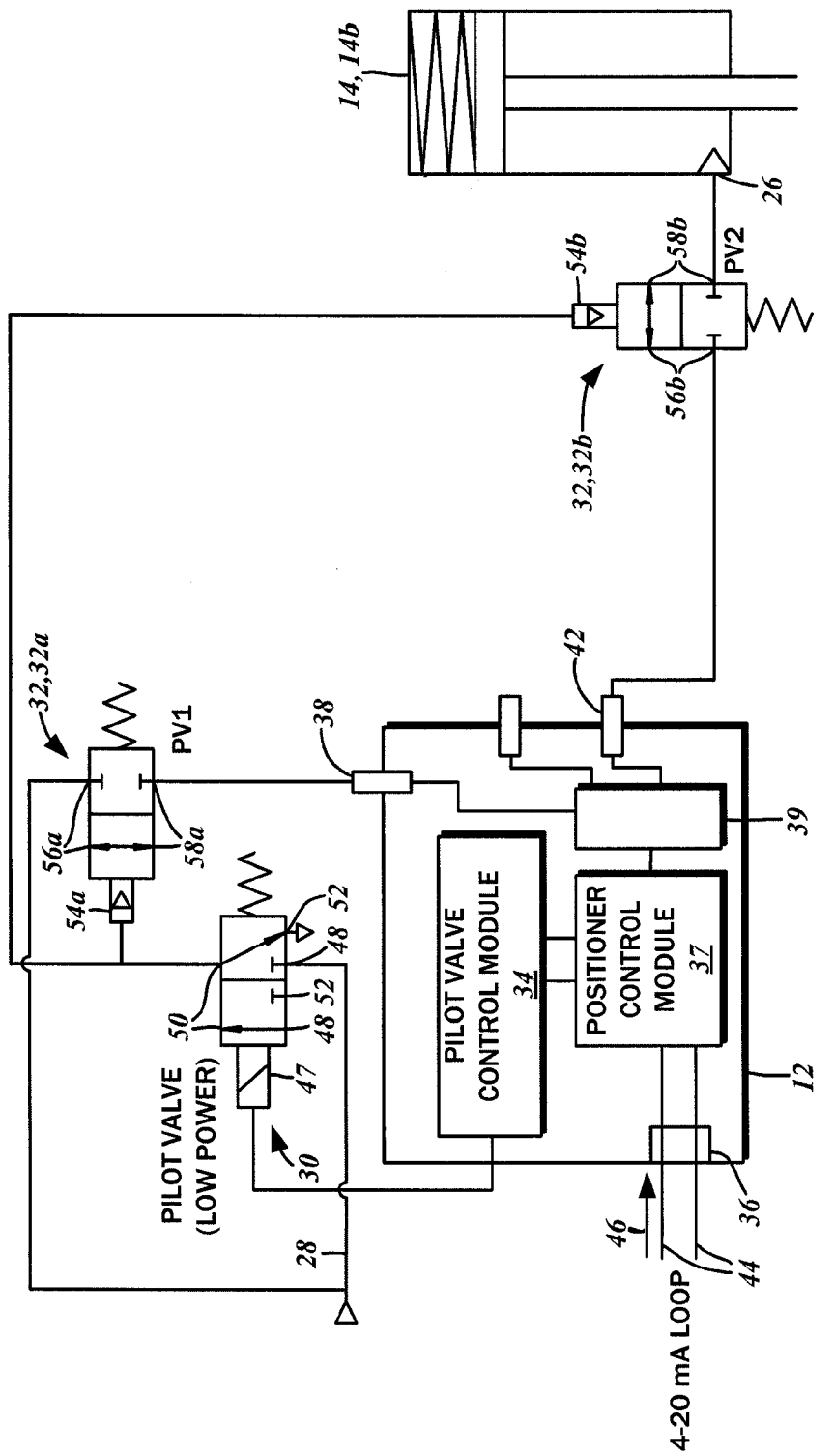
FIG. 2 is a block diagram illustrating the components of the valve positioning apparatus in accordance with a second embodiment including a normally closed pilot valve and normally closed on/off pneumatic valves operating with a single-acting actuator configured for fail freeze operation.

The valve positioner system 10 may also be adapted for a single-acting valve actuator 14b. Referring to FIG. 2, again there is a positioner device 12 drawing power and receiving the valve position signal 46 through the two-wire connection 44 connected to the electrical input port 36. The pilot valve control module 34 is connected in series with the two-wire connection 44, and executes various control logic that manipulates the pilot valve 30. Like the first embodiment 10a, the pilot valve 30 of the second embodiment 10b is a conventional normally closed three/two way valve with spring return including the electrical pilot 47 connected to the pilot valve control module 34, the pressure line intake port 48, the primary output port 50, and the secondary output port 52. The application of an electrical signal to the electrical pilot 47 from the pilot valve control module 34 switches the pilot valve 30 from a normally closed position to the open position, thereby porting the compressed gas from the pressure line 28 through the pilot valve 30 to the primary output port 50 thereof.

The primary output port 50 of the pilot valve 30 is in fluid communication with the first pneumatic valve 32a and the second pneumatic valve 32b, and specifically to the pneumatic pilots 54a, 54b, respectively, thereof. Additionally, the pressure line 28 is in fluid communication with the input port

56a. Upon being pneumatically activated via the pneumatic pilot 54a, the compressed gas is ported through the input port 56a to the output port 58a and to the pressure line intake port 38 of the positioner device 12. As indicated above, the electro-pneumatic transducer 39 selectively ports the input compressed gas on the pressure line intake port 38 to the second output port 42 based upon the control methods executed by the positioner control module 37. The second output port 42 is in fluid communication with the input port 56b of the second pneumatic valve 32b, which is activated and set to an open position (from a normally closed position) via the pneumatic pilot 54b. The compressed gas that is ported to the output port 58b is then passed to the single-acting valve actuator 14b through the second fluid flow passageway 26 thereof.

In the first and second embodiments of the valve positioner system 10a, 10b, there is contemplated a "fail-freeze" function. This refers to a function where the position of the valve actuator 14 is held to the most recent prior to a failure. These failures include loss of power due to the two wire connection 44 being disconnected from the signal source, a loss of pressure in the pressure line 28, loss of the actuator position feedback signal, and so forth. Other failure conditions besides those enumerated above may also trigger the fail-freeze function, and it is understood that the valve positioner system 10 may be adapted thereto.

Figure 3:
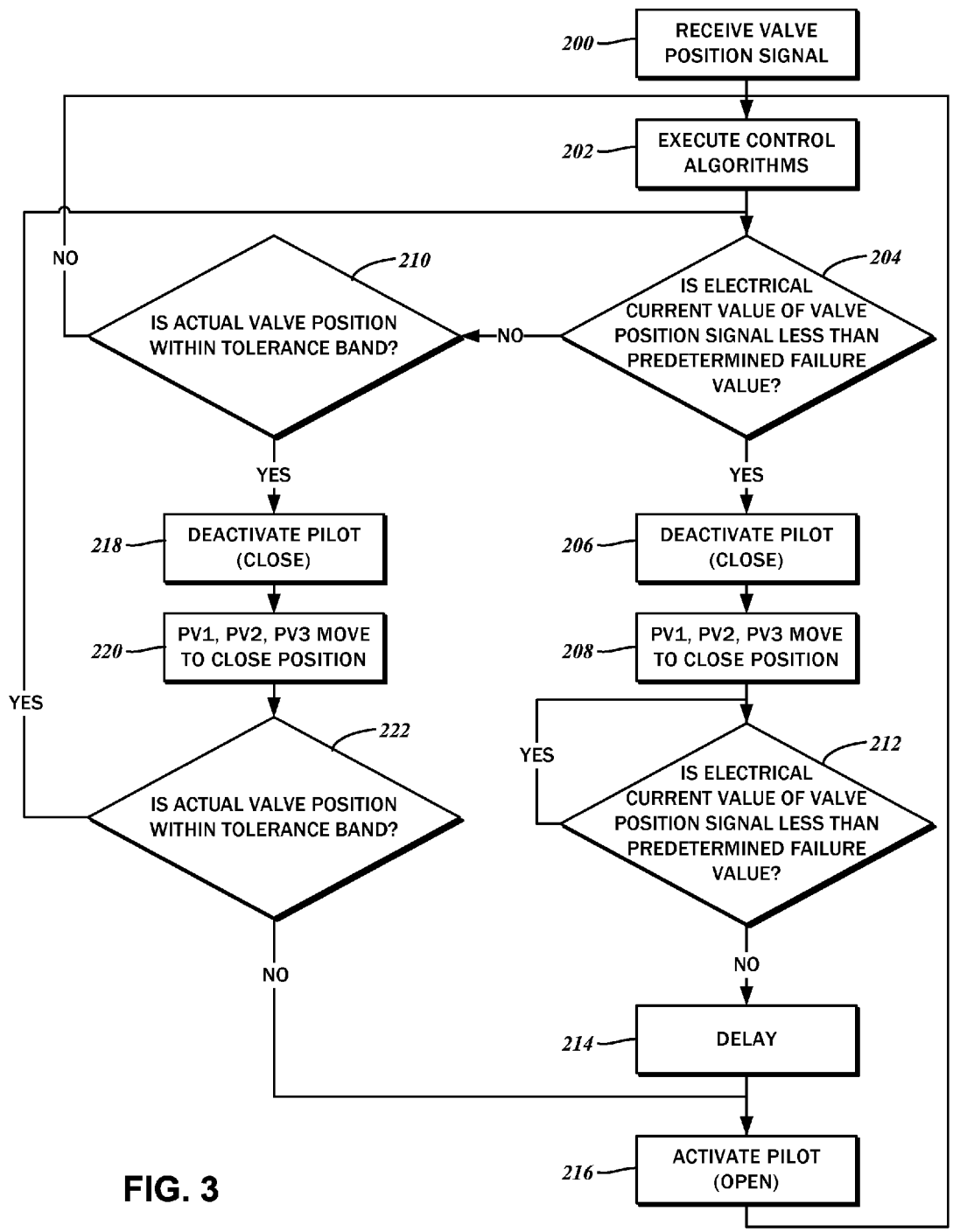
FIG. 3 is a flowchart showing the steps of a method for regulating a process while preventing bleed in connection with fail freeze operation utilizing the first and second embodiments of the valve positioning apparatus.

Now, with additional reference to the flowchart of FIG. 3, the details of the aforementioned control method executed by the pilot valve control module 34 will be described. The method begins with a step 200 of receiving the valve position signal 46. The method continues with a step 202 of executing the control methods by the positioner device 12, and specifically the positioner control module 37. Once one cycle of the control method is executed in step 202, there is a decision branch 204 of determining whether the current (amperage) value as specified in the valve position signal 46 is less than a predetermined failure value. If it is, the method continues with a step 206 of deactivating or closing the pilot valve 30. In response, the pneumatic valves 32a, 32b, and 32c are also moved to the closed position per step 208. Otherwise, the method continues with a step 210 of determining if the actual position of the valve actuator 14 is within a predetermined tolerance band.

Following the deactivation of the pilot valve 30, and the closing of the pneumatic valves 32, the method continues with a decision branch 212 of again determining whether the current (amperage) value as specified in the valve position signal 46 is less than the predetermined failure value. This decision branch is repeated until evaluated true, at which point the loop is exited and continues with a delay step 214. Thereafter, the pilot valve 30 is again activated in step 216, and continues back to executing the control methods in step 202.

Per decision branch 210, if the actual position of the valve actuator 14 is not within the predetermined tolerance band, the method returns to the decision branch 202 of determining whether the current (amperage) value specified in the valve position signal 46 is less than the predetermined failure value. If within the predetermined time spent, the method continues with a step 218 of deactivating the pilot valve 30, followed by the attendant movement of the pneumatic valve 32 to the closed position per step 220. Next, in decision branch 222, if the actual position of the valve actuator 14 is within the predetermined tolerance band, the method returns to the decision branch 204 of determining whether the current value specified in the valve position signal 46 is less than the predetermined failure value. If not, however, the method proceeds to the step 216 of activating the pilot valve 30.

Figure 4:
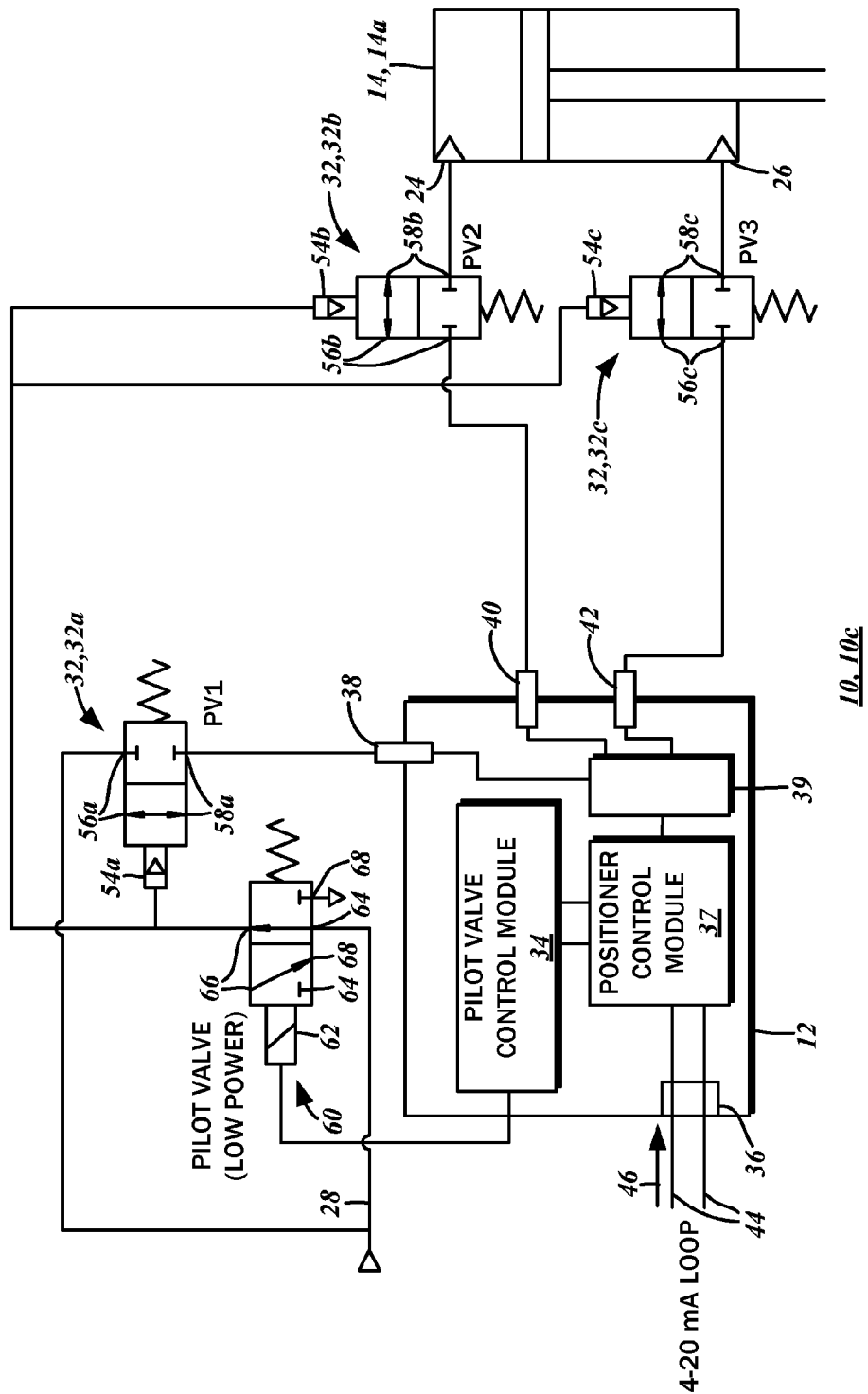
FIG. 4 is a block diagram showing a third embodiment of the valve positioning apparatus including a normally open pilot valve and normally closed on/off pneumatic valves operating with a double-acting actuator and configured for fail safe operation.

A third embodiment of the valve positioner system 10c shown in FIG. 4 contemplates an alternative including a fail-safe function where the position of the valve actuator 14 is transitioned to a "safe" stroke end upon failure. In further detail, this embodiment utilizes the double-acting valve actuator 14a that has the first fluid flow passageway 24 and the second fluid flow passageway 26. As with the first and second embodiments of the valve positioner system 10a, 10b, the third embodiment includes the positioner device 12 drawing power and receiving the valve position signal 46 through the two-wire connection 44 that are connected to the electrical input port 36. The pilot valve control module 34 is connected in series with the two-wire connection 44 and executes control logic that manipulates a normally open electro-pneumatic pilot valve 60.

The pilot valve 60 is a conventional three/two way valve with spring return including an electrical pilot 62 connected to the pilot valve control module 34. Additionally, the pilot valve 60 includes a pressure line intake port 64 connected to the pressure line 28, a primary output port 66, and a secondary output port 68. In its deactivated state, the normally open pilot valve 60 is porting the compressed gas from the pressure line 28 to the primary output port 66. When activated by the pilot valve control module 34, the pilot valve 60 switches from the open position to the closed position thereby restricting the compressed gas to the normally closed first pneumatic valve 32a, second pneumatic valve 32b, and third pneumatic valve 32c. In other words, the pneumatic valves 32 are deactivated when the pilot valve 60 is activated, and vice versa.

Each of the first, second, and third pneumatic valve 32a-c include the respective pneumatic pilots 54a-54c that are in fluid communication with the primary output port 66 of the pilot valve 60. The first pneumatic valve 32a has the input port 56a that is also in fluid communication with the pressure line 28. The output port 58a is in fluid communication with the pressure line intake port 38 of the positioner device 12. Upon being activated via the pneumatic pilot 54a, the compressed gas is ported through the input port 56a to the output port 58a and to the pressure line intake port 38 of the positioner device 12. The electro-pneumatic transducer 39 selectively ports the compressed gas on the pressure line intake port 38 to the first output port 40 and the second output port 42 based upon the control methods executed by the positioner control module 37. The first output port 40 is in fluid communication with the input port 56b of the second pneumatic valve 32b, which is activated and set to an open position (from a normally closed position) via the pneumatic pilot 54b. Along these lines, the second output port 42 is in fluid communication with the input port 56c of the third pneumatic valve 32c. The compressed gas that is ported to the output ports 58b, 58c of the respective second pneumatic valve 32b and third pneumatic valve 32c are then passed to or exhausted from the double-acting valve actuator 14a through the first and second fluid flow passageways 24, 26 thereof.

Figure 5:
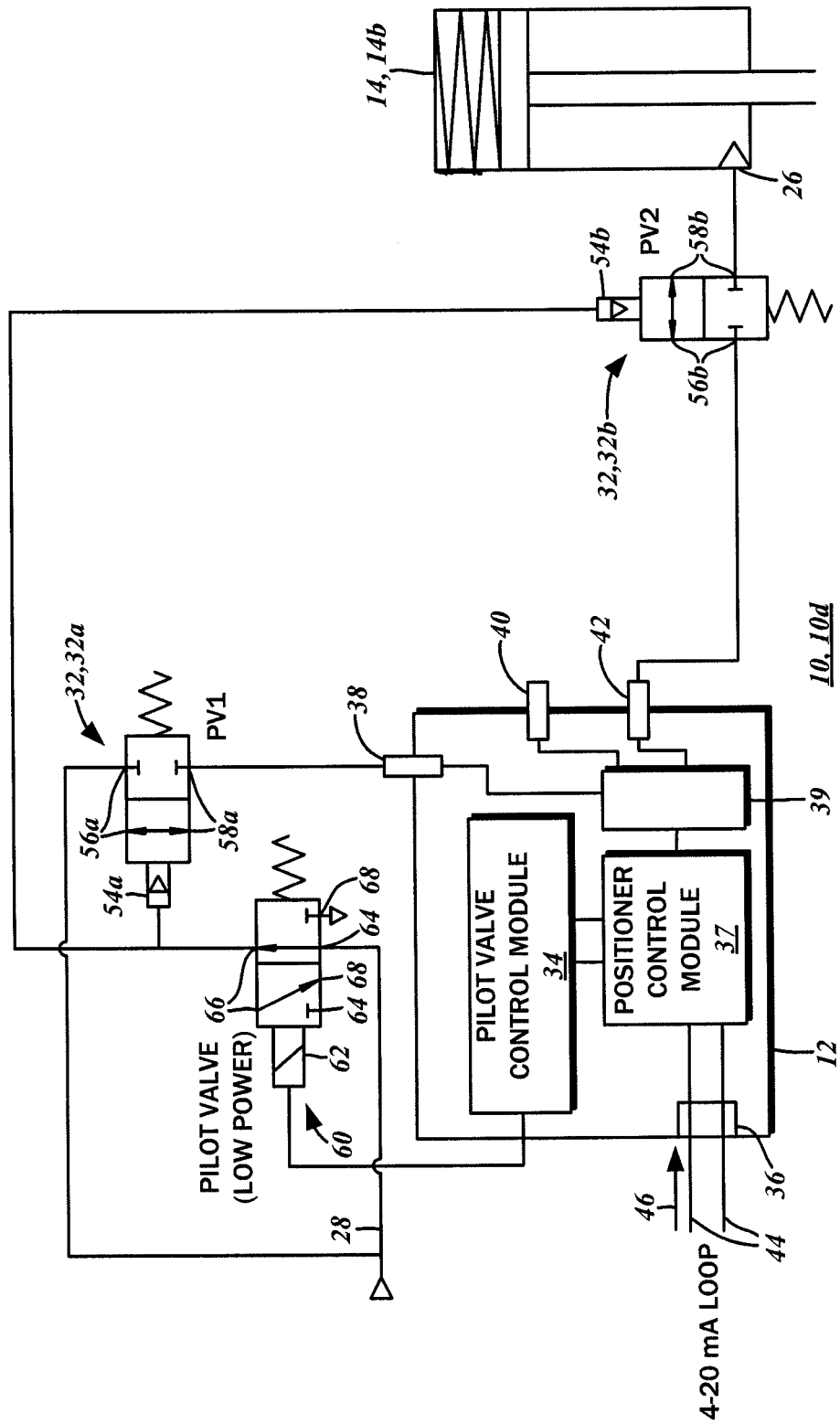
FIG. 5 is a block diagram showing the fourth embodiment of the valve positioning apparatus including a normally open pilot valve and normally closed on/off pneumatic valves operating with a single-acting actuator and configured for fail safe operation.

The third embodiment of the valve positioner system 10c utilizes the double-acting valve actuator 14a and is configured for fail safe operation. A fourth embodiment of the valve positioner system 10d shown in FIG. 5 is likewise configured for failsafe operation, but instead utilizes the single acting valve actuator 14b. The configuration of the valve positioner system 10d is identical in all respects to the third embodiment 10c, except for the elimination of the third pneumatic valve 32c since there is only the first fluid flow passageway 24, and not the second fluid flow passageway 26.

The valve positioner system 10d includes the positioner device 12 drawing power and receiving the valve position signal 46 through the two-wire connection 44 that are connected to the electrical input port 36. The pilot valve control module 34 is connected in series with the two-wire connection 44 and executes control logic that manipulates the normally open electro-pneumatic pilot valve 60.

In its deactivated state, the normally open pilot valve 60 is porting the compressed gas from the pressure line 28 to the primary output port 66. When activated by the pilot valve control module 34, the pilot valve 60 switches from the open position to the closed position thereby restricting the compressed gas to the normally closed first pneumatic valve 32a and the second pneumatic valve 32b. Each of the first and second pneumatic valve 32a-b includes the respective pneumatic pilots 54a-54b that are in fluid communication with the primary output port 66 of the pilot valve 60. The first pneumatic valve 32a has the input port 56a that is also in fluid communication with the pressure line 28. The output port 58a is in fluid communication with the pressure line intake port 38 of the positioner device 12. Upon being activated via the pneumatic pilot 54a, the compressed gas is ported through the input port 56a to the output port 58a and to the pressure line intake port 38 of the positioner device 12. The electro-pneumatic transducer 39 selectively ports the compressed gas on the pressure line intake port 38 to the second output port 42 based upon the control methods executed by the positioner control module 37. The second output port 42 is in fluid communication with the input port 56b of the second pneumatic valve 32b. The compressed gas that is ported to the output port 58b of the second pneumatic valve 32b is then passed to or exhausted from the single-acting valve actuator 14b through the second fluid flow passageway 26 thereof.

Figure 6:
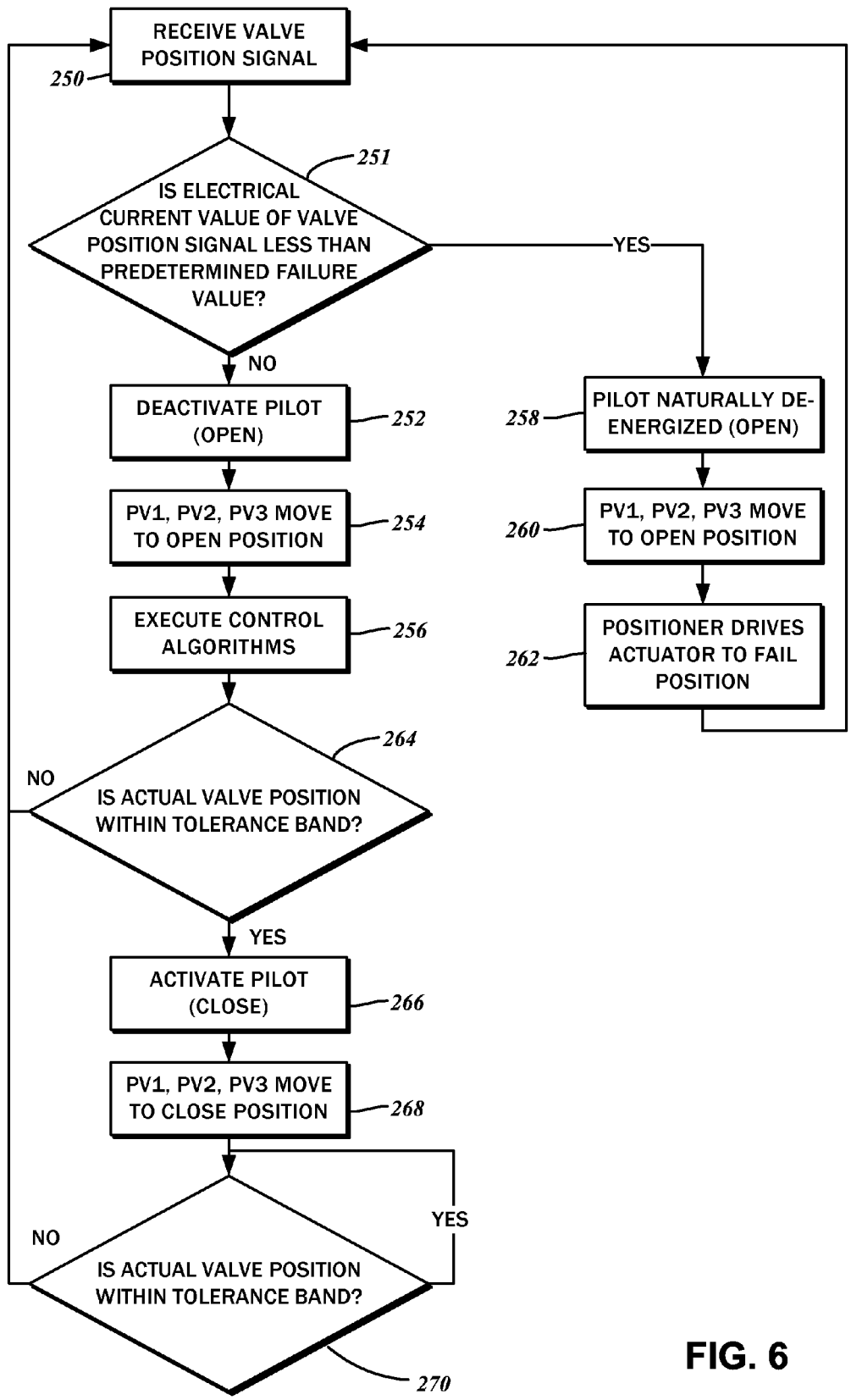
FIG. 6 is a flowchart showing the steps of a method for regulating a process while preventing bleed in connection with fail safe operation utilizing the third and fourth and of the valve positioning apparatus.

The flowchart of FIG. 6 details one embodiment of the control method executed by the pilot valve control module 34 in connection with the normally open pilot valve 60 and the normally closed pneumatic valves 32 to implement fail-safe operation of the valve actuator 14. The method begins with a step 250 of receiving the valve position signal 46 followed by a decision branch 251 of determining whether the current (amperage) value as specified in the valve position signal 46 is less than a predefined failure value. If it is not, the method continues with a step 252 of the activating the pilot valve 60 to an open state. As a result, pneumatic valves 32 are moved to the open position according to step 254. In this condition, per step 256, the method involves executing the control methods by the positioner device 12, i.e., the positioner control module 37. If the current (amperage) value is less than the predefined failure value, the pilot valve 60 is naturally de-energized per step 258, and the pneumatic valves 32 move or have moved to the open position according to step 260. As a result, the positioner device 12 drives the valve actuator 14 to the failed position in step 262, and returns to the decision branch 250.

After the control methods are executed in step 256, the method continues with a decision branch 264 of determining whether the actual position of the valve actuator 14 is within the predetermined tolerance band. If not, the method returns to the decision branch 250. If it is, however, execution proceeds to activating the pilot valve 60 in step 266, which results in the pneumatic valve 60 being moved to the closed position according to step 268. This is followed by the decision branch 270 in which it is again determined whether the actual position of the valve actuator 14 is within the predetermined tolerance band. The method loops until this condition is false, at which point execution returns to the decision branch 250.

Figure 7:
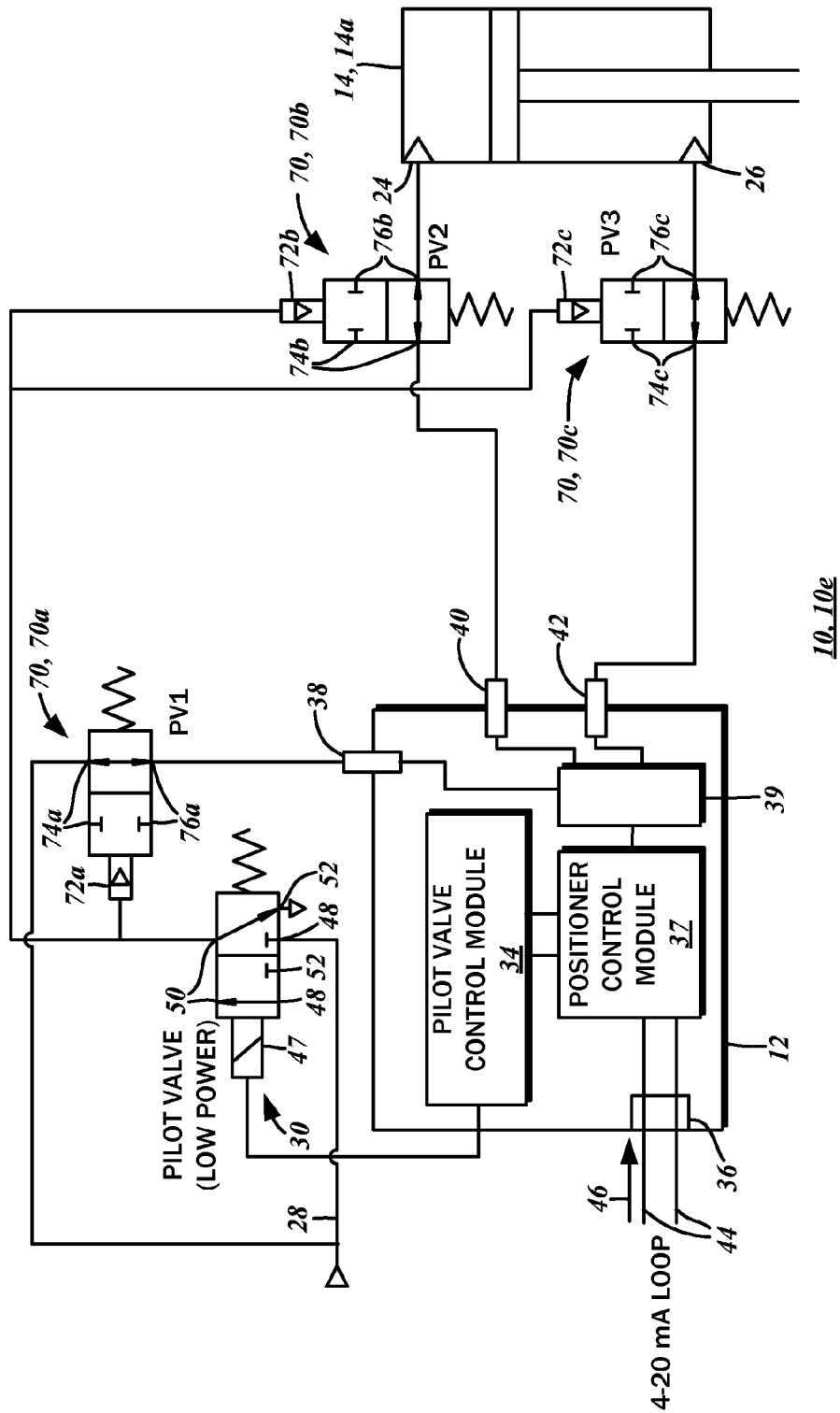
FIG. 7 is a block diagram illustrating the components of a fifth embodiment of the valve positioning apparatus including a normally closed pilot valve and normally open on/off pneumatic valves operating with the double-acting actuator and configured for fail safe operation.

A fifth embodiment of the valve positioner system 10e shown in FIG. 7 contemplates yet another an alternative including a fail-safe function where the position of the valve actuator 14 is transitioned to a "safe" stroke end upon failure. In further detail, this embodiment utilizes the double-acting valve actuator 14a that has the first fluid flow passageway 24 and the second fluid flow passageway 26. As with the forgoing first, second, third and fourth embodiments 10a-10d, the positioner device 12 draws power and receives the valve position signal 46 through the two-wire connection 44 that is connected to the electrical input port 36. The pilot valve control module 34 is connected in series with the two-wire connection 44 and executes control logic that manipulates the normally closed electro-pneumatic pilot valve 30, which is a conventional three/two way valve with spring return.

The pilot valve 30 includes the pressure line intake port 48 connected to the pressure line 28, the primary output port 50, and a secondary output port 52. In its activated state, the normally closed pilot valve 30 is porting the compressed gas from the pressure line 28 to the primary output port 50. When deactivated by the pilot valve control module 34, the pilot valve 30 switches from the closed position to the open position thereby restricting the compressed gas to a normally open first pneumatic valve 70a, a second pneumatic valve 70b, and a third pneumatic valve 70c. The pneumatic valves 70 are activated when the pilot valve 30 is activated.

Each of the first, second, and third pneumatic valves 70a-c include the respective pneumatic pilots 72a-72c that are in fluid communication with the primary output port 50 of the pilot valve 30. The first pneumatic valve 70a has the input port 74a that is also in fluid communication with the pressure line 28. The output port 76a is in fluid communication with the pressure line intake port 38 of the positioner device 12. Upon being activated via the pneumatic pilot 72a, the compressed gas is ported through the input port 74a to the output port 76a and to the pressure line intake port 38 of the positioner device 12.

The electro-pneumatic transducer 39 selectively ports the compressed gas on the pressure line intake port 38 to the first output port 40 and the second output port 42 based upon the control methods executed by the positioner control module 37. The first output port 40 is in fluid communication with the input port 74b of the second pneumatic valve 70b, which is activated and set to an closed position (from a normally open position) via the pneumatic pilot 72b. Along these lines, the second output port 42 is in fluid communication with the input port 74c of the third pneumatic valve 70c. With the pneumatic valves 70 being deactivated, that is, when the pilot valve 30 is deactivated, the compressed gas that is ported to the output ports 76b, 76c of the respective second pneumatic valve 70b and third pneumatic valve 70c are then passed to or exhausted from the double-acting valve actuator 14a through the first and second fluid flow passageways 24, 26 thereof. With the pilot valve 30 activated, the pneumatic valves 70 are activated, the stopping the flow of compressed gas from the input ports 74 to the output ports 76.

Figure 8:
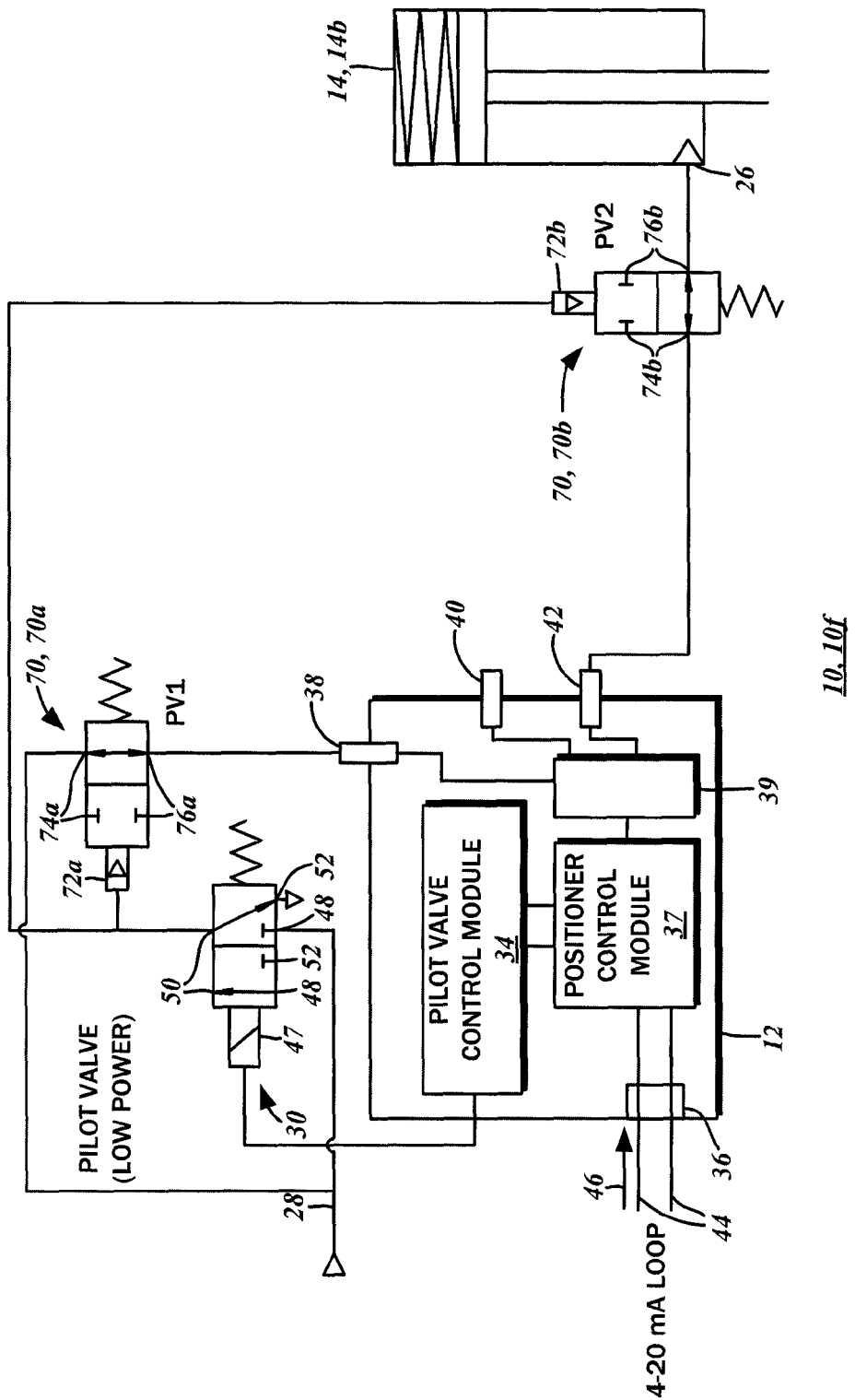
FIG. 8 is a block diagram illustrating the components of a fourth embodiment of the valve positioning apparatus including the normally closed pilot valve and normally open on/off pneumatic valves operating with the single-acting actuator and configured for fail safe operation.

As mentioned above, this embodiment contemplates the use of the double-acting valve actuator 14a. A sixth embodiment of the valve positioner system 10f shown in FIG. 8 is also configured for failsafe operation, but instead utilizes the single acting valve actuator 14b. The configuration of the valve positioner system 10f is identical in all respects to the fifth embodiment 10e, except for the eliminated third pneumatic valve 70c since there is only the first fluid flow passageway 26, and not the second fluid flow passageway 24.

The valve positioner system 10 includes the positioner device 12 drawing power and receiving the valve position signal 46 through the two-wire connection 44 that are connected to the electrical input port 36. The pilot valve control module 34 is connected in series with the two-wire connection 44 and executes control logic that manipulates the normally open electro-pneumatic pilot valve 30.

In an activated state, the normally closed pilot valve 30 is porting the compressed gas from the pressure line 28 to the primary output port 50. When activated by the pilot valve control module 34, the pilot valve 30 switches from the closed position to the open position, porting the compressed gas to the normally open first pneumatic valve 70a and the second pneumatic valve 70b. Each of the first and second pneumatic valve 70a-70b includes the respective pneumatic pilots 72a-72b that are in fluid communication with the primary output port 50 of the pilot valve 30. The first pneumatic valve 70a has the input port 74a that is also in fluid communication with the pressure line 28. The output port 76a is in fluid communication with the pressure line intake port 38 of the positioner device 12. When deactivated, the compressed gas is ported through the input port 74a to the output port 76a and to the pressure line intake port 38 of the positioner device 12. When activated, the first pneumatic valve 70a is closed.

The electro-pneumatic transducer 39 selectively ports the compressed gas on the pressure line intake port 38 to the second output port 42 based upon the control methods executed by the positioner control module 37. The second output port 42 is in fluid communication with the input port 74b of the second pneumatic valve 70b. The compressed gas that is ported to the output port 76b of the second pneumatic valve 70b is then passed to or exhausted from the single-acting valve actuator 14b through the second fluid flow passageway 26 thereof.

Figure 9:
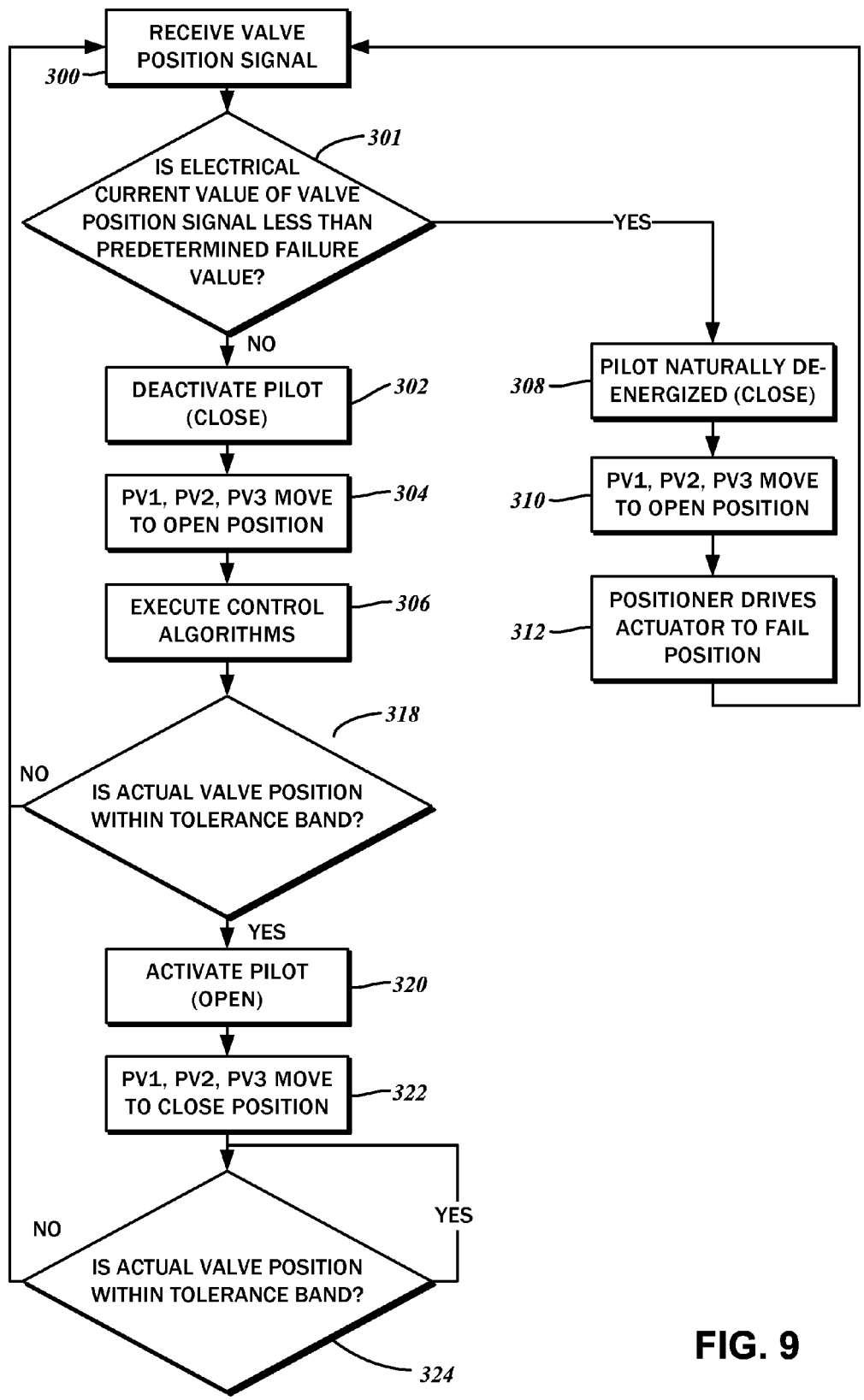
FIG. 9 is a flowchart showing the steps of a method for regulating a process while preventing bleed in connection with fail safe operation.

The flowchart of FIG. 9 describes another embodiment of the control method executed by the pilot valve control module 34 in connection with the normally closed pilot valve 30 and the normally open pneumatic valves 70 to implement fail-safe operation of the valve actuator 14. The method begins with a step 300 of receiving the valve position signal 46, followed by a decision branch 301 of determining whether the current (amperage) value as specified in the valve position signal 46 is less than a predefined failure value. If it is not, the method continues with a step 302 of the activating the pilot valve 60 to a closed state. As a result, pneumatic valves 70 are moved to the open position according to step 304. In this condition, per step 306, the method involves executing the control methods by the positioner device 12, i.e., the positioner control module 37. If the current (amperage) value is less than the predefined failure value, the pilot valve 30 is naturally de-energized per step 308, and the pneumatic valves 70 move or have moved to the open position according to step 310. As a result, the positioner device 12 drives the valve actuator 14 to the failed position in step 312, and returns to the decision branch 300.

After the control methods are executed in step 306, the method continues with a decision branch 318 of determining whether the actual position of the valve actuator 14 is within the predetermined tolerance band. If not, the method returns to the decision branch 300. If it is, however, execution proceeds to activating the pilot valve 30 in step 320, which results in the pneumatic valve 70 being moved to the closed position according to step 322. This is followed by the decision branch 324 in which it is again determined whether the actual position of the valve actuator 14 is within the predetermined tolerance band. The method loops until this condition is false, at which point execution returns to the decision branch 300.

The particulars shown herein are by way of example only for purposes of illustrative discussion, and are not presented in the cause of providing what is believed to be most useful and readily understood description of the principles and conceptual aspects of the various embodiments a fourth of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A valve positioner system comprising:
    an electronic circuit powered from a signaling and power connection loop and receptive to a valve position signal thereon;
    a pilot valve electrically controlled by the electronic circuit based upon the valve position signal;
    a plurality of pneumatic valves activated pneumatically by the pilot valve; and
    a transducer separate from the pilot valve and connectible to a valve actuator to selectively port gas thereto through at least one of an activated one of the plurality of pneumatic valves, the selectively ported gas corresponding to the valve position signal.

2. The valve positioner system of claim 1, wherein the plurality of pneumatic valves includes a pressure line control valve having an input port coupled to a pressure line and an output port selectively coupled to a pressure line intake port of the transducer.

3. The valve positioner system of claim 2, wherein:
    the valve actuator is a double acting type with a first fluid flow passageway and a second fluid flow passageway; and
    the plurality of pneumatic valves includes:
        a first actuator control valve pneumatically activated by the pilot valve and having an input port coupled to a first transducer output and an output port coupled to the first fluid flow passageway of the valve actuator; and
        a second actuator control valve pneumatically activated by the pilot valve and having an input port coupled to a second transducer output and an output port coupled to the second fluid flow passageway of the valve actuator.

4. The valve positioner system of claim 3, wherein the pilot valve is normally closed and each of the pneumatic valves is normally closed for operating in a fail-freeze mode.

5. The valve positioner system of claim 3, wherein the pilot valve is normally open and each of the pneumatic valves is normally closed for operating in a failsafe mode.

6. The valve positioner system of claim 3, wherein the pilot valve is normally closed and each of the pneumatic valves is normally open for operating in a failsafe mode.

7. The valve positioner system of claim 2, wherein:
    the valve actuator is a single acting type with a first fluid flow passageway; and
    the plurality of pneumatic valves includes:
        a first actuator control valve pneumatically activated by the pilot valve and having an input port coupled to a first transducer output and an output port coupled to the first fluid flow passageway of the valve actuator.

8. The valve positioner system of claim 7, wherein the pilot valve is normally closed and each of the pneumatic valves is normally closed for operating in a fail-freeze mode.

9. The valve positioner system of claim 7, wherein the pilot valve is normally open and each of the pneumatic valves is normally closed for operating in a failsafe mode.

10. The valve positioner system of claim 7, wherein the pilot valve is normally closed and each of the pneumatic valves is normally open for operating in a failsafe mode.

11. A valve positioner for controlling a valve actuator, comprising:
   a positioner device receptive to a valve position signal from an external signaling and power connection loop and including a pressure line intake port and a first output port;
   a pilot valve in communication with the positioner device and being actuatable thereby to a first position and a second position coupling a pneumatic pressure line to a pilot valve output port based upon a pilot input from the positioner device derived from the valve position signal;
   a pressure line selection pneumatic valve with a pilot port coupled to the pilot valve output port, an input port coupled to the pneumatic pressure line, and an output port coupled to a pressure line intake port of the positioner device; and
   a first actuator pneumatic valve with a pilot port coupled to the pilot valve output port, an input port coupled to the first output port of the positioner device, and an output port coupled to a first fluid flow passageway of the valve actuator;
   wherein the positioner device selectively ports gas from the pressure line upon the pilot valve activating the pressure line selection pneumatic valve and the first actuator pneumatic valve based on commands from the external signaling and power connection loop.

12. The valve positioner of claim 11, wherein the valve actuator is single-acting.

13. The valve positioner of claim 11, further comprising:
   a second actuator pneumatic valve with a pilot port coupled to the pilot valve output port, and input port coupled to a second output port of the positioner device, and an output port coupled to a second fluid flow passageway of the valve actuator;
   wherein the valve actuator is double-acting, and the positioner device further selectively ports gas from the pressure line upon the pilot valve additionally activating the second actuator pneumatic valve based on the commands from the external signaling and power connection loop.

14. The valve positioner of claim 11, wherein the positioner device includes:
   a positioner control module connected to the external signaling and power connection loop;
   a pilot valve control module in electrical communication with the pilot valve; and
   a transducer controlled by the positioner control module to selectively port the gas from the pressure line intake port to the first output port.

15. The valve positioner of claim 11, wherein an electrical current value of the valve position signal is representative of a set valve actuator position.

16. The valve positioner of claim 11, wherein the valve position signal has a nominal current value between 4 and 20 milliamperes (mA).

17. A method for controlling a valve actuator with a valve positioner device using a pilot valve and a plurality of pneumatic valves regulating a position of the valve actuator, the method comprising the steps of:
   receiving a valve position signal from an external source; and
   deactivating the pilot valve in response to the received valve position signal being less than a predetermined failure value;
   wherein the deactivation of the pilot valve effects a deactivation of the plurality of pneumatic valves, the deactivated plurality of pneumatic valves causing one of the valve actuator freezing in a previously set position, and the valve actuator moving to a safe failure position.

18. The method of claim 17, further comprising the step of:
   activating the pilot valve in response to the received valve position signal being greater than a predetermined failure value, the activation of the pilot valve causing an activation of the plurality of pneumatic valves.

19. The method of claim 17, further comprising the steps of:
   generating a predetermined delay;
   activating the pilot valve.

20. The method of claim 17, wherein the step of deactivating the pilot valve transitions the pilot valve from an open position in which gas from a pressure line is ported to respective pilots of each of the pneumatic valves to a closed position in which gas from the pressure line is blocked to the respective pilots of each of the pneumatic valves.

21. The method of claim 17, wherein the step of deactivating the pilot valve transitions the pilot valve from an close position in which gas from the pressure line is blocked to the respective pilots of each of the pneumatic valves to an open position in which gas from a pressure line is ported to respective pilots of each of the pneumatic valves.

* * * * *